United States Patent
Dickinger et al.

(10) Patent No.: US 9,067,377 B2
(45) Date of Patent: Jun. 30, 2015

(54) FILLING SHOE

(75) Inventors: Johann Dickinger, Bad Wimsbach (AT); Christian Dumanski, Plesching-Steyregg (AT); Harald Kaiser, Kirchham (AT); Roland Mayrhuber, Bad Wimsbach (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 14/344,976

(22) PCT Filed: Sep. 14, 2012

(86) PCT No.: PCT/AT2012/050137
§ 371 (c)(1),
(2), (4) Date: Apr. 14, 2014

(87) PCT Pub. No.: WO2013/036982
PCT Pub. Date: Mar. 21, 2013

(65) Prior Publication Data
US 2014/0328965 A1 Nov. 6, 2014

(30) Foreign Application Priority Data
Sep. 16, 2011 (AT) .................. A 1335/2011

(51) Int. Cl.
*B30B 15/30* (2006.01)
*B29B 7/10* (2006.01)
*B29K 105/00* (2006.01)

(52) U.S. Cl.
CPC .............. *B30B 15/304* (2013.01); *B29B 7/10* (2013.01); *B29K 2105/251* (2013.01)

(58) Field of Classification Search
CPC ..................................... B30B 15/304
USPC ......... 425/256, 258, 259, 260, 425, 426, 428, 425/429, 431
See application file for complete search history.

(56) References Cited

U.S. PATENT DOCUMENTS

| 2,848,741 A | 8/1958 | McCracken, Sr. |
| 3,328,840 A | 7/1967 | Vinson |
| 5,340,599 A * | 8/1994 | Maruyama et al. ........... 425/107 |
| 2007/0071632 A1 | 3/2007 | Revol |

(Continued)

FOREIGN PATENT DOCUMENTS

| DE | 24 50 736 B1 | 2/1976 |
| DE | 60 2004 005 070 T2 | 11/2007 |

(Continued)

OTHER PUBLICATIONS

JPO English machine translation of JP 2010-142864, retrieved Feb. 4, 2015.*

(Continued)

*Primary Examiner* — Timothy Kennedy
(74) *Attorney, Agent, or Firm* — Collard & Roe, P.C.

(57) ABSTRACT

The invention relates to a filling shoe (9) for filling a molding cavity (10) of a pressing mold with a powder, comprising a casing (14) with at least one filling cavity (13) having at least one side wall, wherein at least one filling opening (18), via which the powder can be introduced into the filling cavity (13), is designed on the casing (14). At least one stripping element (21) connected to a drive unit (23) is arranged in the filling cavity (13), wherein the at least one stripping element (21) is rotatable.

9 Claims, 2 Drawing Sheets

(56) References Cited

U.S. PATENT DOCUMENTS

| | | |
|---|---|---|
| 2009/0142437 A1 | 6/2009 | Roemer et al. |
| 2010/0015264 A1 | 1/2010 | Krämer |
| 2010/0270706 A1 | 10/2010 | Vest et al. |

FOREIGN PATENT DOCUMENTS

| | | |
|---|---|---|
| DE | 20 2007 002707 U1 | 8/2008 |
| DE | 10 2010 015016 A1 | 11/2010 |
| EP | 2 065 174 A2 | 6/2009 |
| JP | H11-197891 A | 7/1999 |
| JP | 2000-037718 A | 2/2000 |
| JP | 2006-021448 A | 1/2006 |
| JP | 2009-127117 A | 6/2009 |
| JP | 2010-007132 A | 1/2010 |
| JP | 2010-082625 A | 4/2010 |
| JP | 2010142864 A * | 7/2010 |

OTHER PUBLICATIONS

International Search Report of PCT/AT2012/050137, mailed Mar. 8, 2013.

* cited by examiner

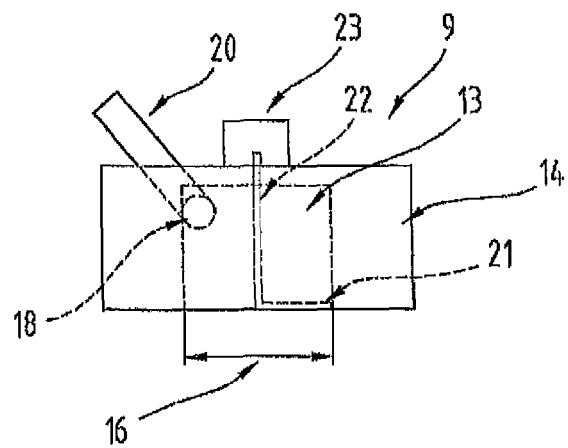
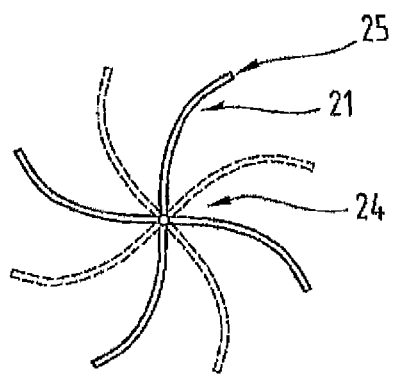
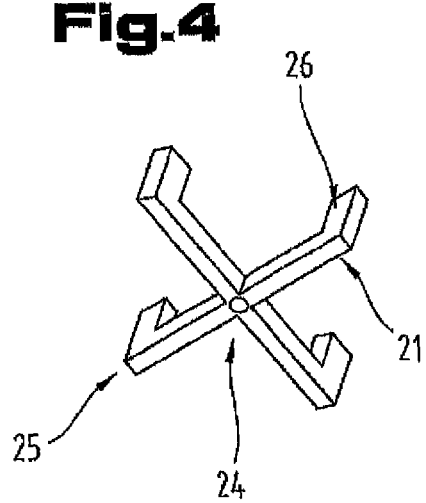
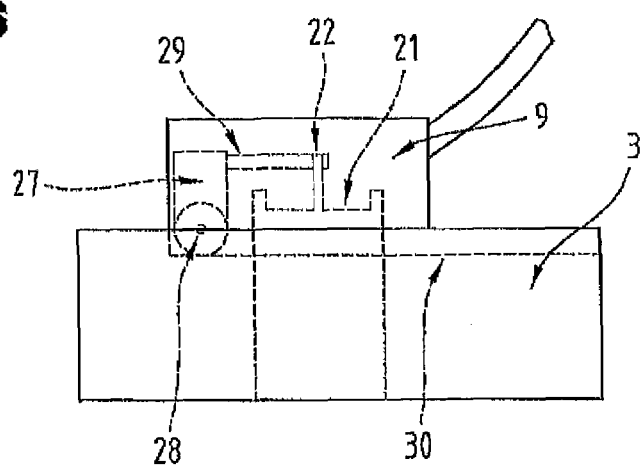

FILLING SHOE

CROSS REFERENCE TO RELATED APPLICATIONS

This application is the National Stage of PCT/AT2012/050137 filed on Sep. 14, 2012, which claims priority under 35 U.S.C. §119 of Austrian Application No. A 1335/2011 filed on Sep. 16, 2011, the disclosure of which is incorporated by reference. The international application under PCT article 21(2) was not published in English.

The invention relates to a filling shoe for filling a mold cavity of a press mold with a powder, comprising a casing with at least one filling cavity comprising at least one side wall, wherein at least one filling opening is formed on the casing through which the powder can be inserted into the filling cavity.

For the manufacture of sintered molded parts, powders or powder mixtures are filled into a press mold, in which they are pressed into a so-called green compact, which is sintered and processed in further steps. For filling the press mold filling shoes are used, which enable the automatic filling of the mold cavity of the press mold. In the simplest case the filling is performed by gravity. The powder is introduced in the required amount from a storage container solely by the effect of gravity. This has the advantage that the structural complexity of the filling shoe can be minimal. However, the disadvantage of this method is that the filling is uneven, which results in differences in density and inhomogeneities in the finished sintered molded part.

To minimize or reduce this disadvantage various different methods and devices have been proposed in the prior art. A summary of these methods is given for example in DE 60 2004 005 070 T2, which also discloses a device for filling a molding die with at least one powder. Said device comprises a device for filling at least one powder, at least one device for the surface deposition of the powder filled into the device, at least one deflector arranged over a specific part of the molding die, wherein the deflector is able to catch locally at least a portion of the surface deposited powder and deflect it in the direction of the said specific position of the mold.

The objective of the present invention is to create a filling shoe which improves the filling of the mold cavity of a press mold with a powder.

Said objective of the invention is achieved by the aforementioned filling shoe, wherein at least one scraping element is arranged in the filling cavity which is connected to a drive device, wherein the at least one scraping element is mounted rotatably.

It is an advantage in this case that the press mold can be filled more homogenously and with a more even density distribution of the powder by the rotational movement of the scraping element after filling the mold cavity of the press mold. In this way the gravity filling of the press mold can still be applied, and the technical effort required can be kept to a minimum, even with regard to the configuration of the axis of rotation for the scraping element and the additional arrangement of the drive device. By means of the rotational movement more "excess" powder can be introduced into the mold cavity of the press mold than is the case when scraping only in a linear movement of the scraping element, which consequently reduces the use of raw material. By means of the rotational movement a micro-movement of the powder particles in the surface layers of the filing can also be induced, whereby a higher density can be achieved in said layers even when filling the mold cavity, so that sintered molded parts can be produced more easily that have a lower core density and a greater surface density and thus in the core have a certain degree of toughness as well as a greater surface hardness. This is also achieved by means of axial pressing, however it is possible by using the filling shoe according to the invention to achieve these properties of the finished sintered molded part more easily and reduce the pressing forces.

The at least one scraping element can be designed in the form of a strip in order to prevent friction between the powder particles and the scraping element and thus avoid "smearing" the powder particles. At the same time in this way however also the cross section available for filling the mold cavity of the press mold is reduced as little as possible.

It is also possible, that the at least one scraping element at a free end facing the casing has a bend which is immediately adjacent to the side wall of the filling cavity. In this way it is possible to prevent the scraped off powder remaining stuck to the side wall of the filling cavity, in that the latter is also scraped off by the bend.

In the preferred embodiment variant of the filling shoe a plurality of scraping elements are arranged, the latter forming a common hub. In this way the filling process of the mold cavity of the press mold can take less time, in that at least one complete rotation of the scraping element is no longer necessary for scraping off the powder. It is particularly advantageous in this case if the scraping elements are arranged to be symmetrical.

The drive device can be a motor which is arranged on the casing of the filling shoe. Preferably, the motor is an electric motor. In this way a compact design of the filling shoe is achieved in that a shaft of the motor, on the other side of which the at least one scraping element is secured, can be configured to be relatively short. If necessary, the motor can form part of the casing of the filling shoe, whereby the structural height of the filling shoe can be reduced further.

However, it is also possible for the drive device to be a scraping element, which is arranged in or on the side wall of the filling cavity, and for a translatory movement of the filling shoe to be converted into a rotary movement. In this way the movement of the filling shoe, i.e. the delivery of the filling shoe and the removal of the filling shoe from the mold cavity of the press mold, can be used as the drive for the at least one scraping element, so that it is possible to avoid having a separate motor. In this way it is also possible to reduce the structural height of the filling shoe further.

It is also an advantage if the at least one filling opening is formed above and laterally offset to the axis of rotation of the at least one scraping element on the casing. By means of this design it is possible not to provide a separate filling station for filling the press mold, and the filling shoe can be integrated into the press, as a filling hose connected to the filling opening of the casing can be guided laterally and thus does not interfere in the region of the upper die of the press.

The at least one scraping element can be configured to be straight in the simplest case, thereby simplifying the manufacture of the scraping element. However, it is also possible for the at least one scraping element to be curved in a concave form, whereby the scraped off powder can be moved in the direction of the axis of rotation of the scraping element and thus in the direction of the center of the mold cavity—as viewed in cross section from above.

A further improvement of the homogenization and evening out of the input of powder into the mold cavity of the press mold can be achieved if the drive device is designed to have a direction of rotation changing device for changing the direction of rotation of the scraping element, as in this way the respectively scraped area of the mold cavity is scraped from both sides by the at least one scraping element. In an arrangement with several scraping elements the filling process can also be shortened as one scraping element now only covers one sector of the cross section of the mold cavity—as viewed from above—so that a complete rotation is no longer necessary, whereby by changing the direction of rotation of the scraping element there is still an improvement in the density distribution.

To prevent the corrosion of the scraping element, particularly if the latter also scrapes the inside of the casing during the scraping, it is also possible that the at least one scraping element is provided at least partly with a friction-reducing coating or is made from a material which has a lower coefficient of friction in relation to the material of the casing.

For a better understanding of the invention the latter is explained in more detail with reference to the following Figures.

In a schematically simplified representation:

FIG. 3 shows the filling shoe according to FIG. 3 in side view;

FIG. 4 shows a hub with a plurality of scraping elements in oblique view from below;

FIG. 5 shows an embodiment variant of a hub in a view from below;

FIG. 6 shows an embodiment variant of a filling shoe in side view.

Figure 1:
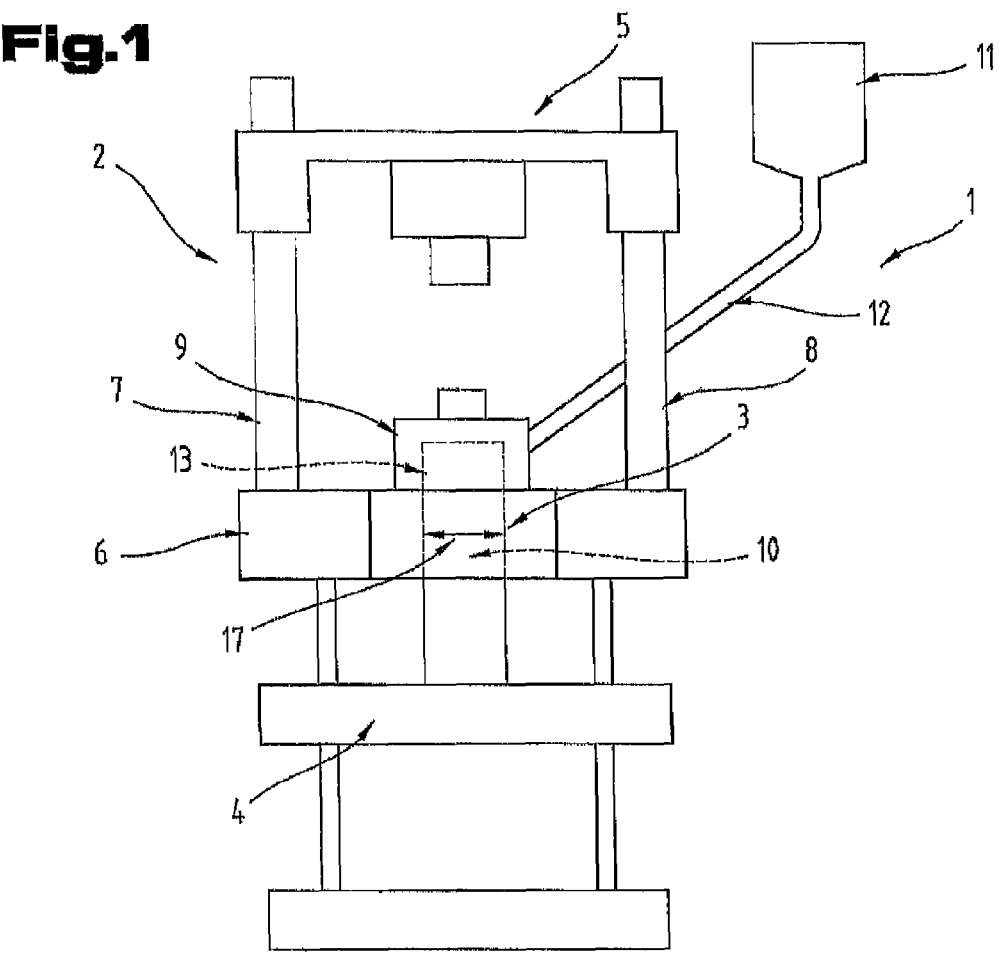
FIG. 1 shows a powder press with a filling shoe in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a simplified representation of a press 1, as used for the production of sintered molded parts. Said press 1 comprises a pressing device 2 for applying the compaction pressure and a die 3, i.e. a press mold, for compacting a sintering powder from which the sintered molded part is made. The pressing device 2 comprises a lower punch mount 4 with a lower punch, an upper punch mount 5 with an upper punch, and a die mount 6. The lower punch mount 4 and/or the upper punch mount 5 and/or the die mount 6 are mounted by columns 7, 8 and can be configured to move along the latter vertically. As such presses 1 are already known from the prior art there is no need for any further explanation at this point and a person skilled in the art is referred to the relevant literature.

The press 1 also comprises a filling shoe 9, which is configured to move horizontally between a position of rest and a filling position over a mold cavity 10 of the die 3. The position of rest is to the side of the upper punch, so that the filling shoe 9 does not interfere with the closing movement of the press 1, i.e. the lowering of the upper punch into the mold cavity 10.

The filling shoe 9 is connected to at least one storage container 11 via at least one pipe 12, by means of which the powder or the powder mixture for producing the green compact or pellet is supplied from the storage container 11 to a filling cavity 13 of the filling shoe 9, preferably by using gravity. The filling cavity 13 is thus located during the filling position immediately above the mold cavity 10 of the die 3, so that the powder can be introduced directly into the mold cavity 10.

Figure 2:
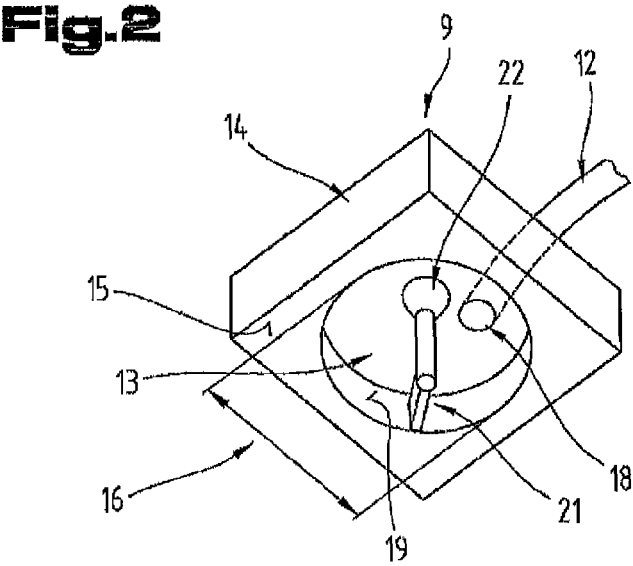
FIG. 2 shows a filling shoe in an oblique view from below.

A first embodiment variant of the filling shoe 9 is shown in FIGS. 2 and 3 in an oblique view from above or in a side view.

The filing shoe 9 comprises a casing 14 in which the filling cavity 13 is formed. The casing 14 is preferably made from a metal material. The casing 14 with respect to its contact surface 15 on the die 3 (FIG. 1) is at least so large that the mold cavity 10 of the die 3 is covered fully by the sintering powder during the filling. Preferably, a cross section 16 of the filling cavity 13 of the casing 14—as viewed in horizontal direction—at least in the region of the contact surface 15 of the casing 14 on the die 3 has a size which is at least almost the same size as the cross section 17 of the mold cavity 10 viewed in the same direction and in the region of the contact surface 15 of the casing 14. However, it is also possible that said cross section 16 of the filling cavity 13 is slightly larger or slightly smaller than the cross section 17 of the mold cavity 10, wherein 'slightly' means that the cross section 16 of the filling cavity 13 differs by a maximum of ±30%, in particular a maximum of ±10%, from the cross section 17 of the mold cavity 10.

On or in the casing 14 at least one filling opening 18 is formed, through which powder is inserted into the filling cavity 13. For a more rapid filling of the mold cavity 10 with powder also more than one filling opening 18 can be provided, for example two or three, whereby the filling openings 18 can be arranged next to one another or above an inner surface 19 of the filling cavity 13, in particular distributed symmetrically.

Preferably, a connecting element 20 is formed in the path of the filling opening 18 outwardly on the casing 14 for each filling opening 18, by means of which the pipe 12 for the powder supply is connected to the casing. It is also possible that a plurality of filling openings 18 is provided with a common connecting element 20.

In the filling cavity 13 at least one scraping element 21 is arranged rotatably and connected to a shaft 22. The shaft 22 is guided through the casing 14 and connected to a drive device 23. The drive device 23 is in this embodiment variant a motor, in particular an electric motor. In this way a rotary movement of the scraping element 21 is made possible.

The scraping element 21 is preferably designed in the form of a strip, as shown in FIGS. 2 and 3, and thus has a longitudinal extension which is greater than the cross section of the scraping element 21.

The at least one scraping element 21 extends preferably with its longitudinal extension from an axis of rotation formed by the shaft 22 to the inner surface 19 of the casing 14, whereby in the particularly preferred embodiment variant of the filling shoe 9 the scraping element 21 projects up to said inner surface 19, so that the inner surface during the rotational movement of the scraping element 21 is also scraped at least partly. For this reason the cross section 16 of the filling cavity 13 at least in the region of the contact surface 15 of the casing 14 of the filling shoe 9 is preferably circular, i.e. in the area which is scraped over by the scraping element 21.

Furthermore, the at least one scraping element 21 extends in vertical direction preferably into the plane of the contact surface 15. However, it is also possible that the scraping element 21 is designed not only to be horizontally rotatable, but also so that a vertical lifting movement can be performed so that the scraping element 21 is arranged in the position of rest above the contact surface 15 in the filling cavity 13. It is thus possible that the scraping element 21 prior to the rotational movement performs a lifting movement in order to bring it to the surface that needs to be scraped. Alternatively, it is also possible for the lifting movement to be performed at the same time as the rotational movement, i.e. for example the scraping element 21 is lowered in a spiral-like movement. If the scraping element 21 scrapes over a cross section which is smaller than the horizontal cross section 17 of the mold cavity 10 of the die 3 (FIG. 1), it is also possible for the scraping element 21 to dip into the mold cavity 10 during the scraping.

FIGS. 4 and 5 show different embodiment variants of the scraping element 21. It is a common feature of both embodiment variants that a plurality of scraping elements 21 are combined to form a joint element, which in particular has the form of a hub 24. The shaft 22 (e.g. FIG. 3) is thus connected to the hub 24 at the middle point or in the region of the middle point. The hub 24 can also be configured in one piece so that the scraping elements 24 form a single joint component.

According to FIG. 4 four strip-like scraping elements 21 are formed on the hub 24, which are offset relative to one another by at least approximately 90° (taking into consideration the cross section of the scraping elements 21).

FIG. 4 also shows an embodiment variant in which a bend 26 is formed at a free end 25 of at least one scraping element 21, i.e. the end 25 opposite the shaft 22 of the scraping element 21 in its longitudinal direction. Preferably all of the scraping elements 21 have such a bend 26. The scraping element(s) 21 thus has/have an L-shaped cross section when seen in side view. It is thus possible for a larger area of the inner surface 19 of the filling cavity 13 of the casing 14 of the filling shoe 9 (e.g. FIG. 3) to be freed by the scraping elements 21 of adhering powder from the filling process of the mold cavity 10 of the die 3 (FIG. 1). For this purpose bends 26 are provided in the filling cavity 13 of the filling shoe 9 immediately adjacent to the inner surface 19 of the filling cavity. The height of the bends 26 can correspond at least approximately to the height of the inner surface 19 of the filling cavity 13 or only to part of the height.

The representation of the hub 24 in FIG. 5 shows on the one hand that in addition to the straight form of the scraping elements 21—as viewed in horizontal direction—in FIGS. 2 to 4 it is also possible that the latter have a different shape and are in particular concave as shown in FIG. 5. On the other hand it is also shown that more than four scraping elements 21 are arranged in the filling cavity 13 (FIG. 3), for example eight, as indicated by dashed lines in FIG. 5. Preferably, however the scraping elements 21 are arranged distributed evenly around the circumference of the filling cavity 13, so that sectors of equal size are provided between the scraping elements 21.

The concave curvature of the scraping element 21 can thus be configured so that the latter is curved in the form of a section of a circle. Furthermore; it is possible that the radius of curvature of the scraping elements 21 is smaller from the middle point of the hub 24 in the direction of the end 25, so that the scraped off powder is moved at least partly in the direction of the middle point. In addition, it is also possible that the scraping elements 21 are also curved in vertical direction and that the latter are thus configured to be at least approximately scoop-like.

It should be noted that the hub 24 can also comprise geometrically differing scraping elements 21, for example both straight and curved.

FIG. 6 shows a further embodiment of the filling shoe 9 in side view and sitting on the die 3, wherein the same reference numerals and component names have been used for the same parts as in the preceding FIGS. 1 to 5. To avoid unnecessary repetition reference is made to the detailed description of these Figures.

Said embodiment variant differs from the one described above only in the type of drive of the scraping element 21. In this way the linear movement of the filling shoe 9 is used during the delivery from the position of rest into the filling position via the mold cavity 10 of the die 3 (FIG. 1) and said translatory movement is converted into a rotational movement. For this the filling shoe 9 comprises at least one movement converting device 27, which is arranged in or on the side wall of the filling cavity 13 of the casing 14 and converts the translatory movement of the filling shoe 9 into a rotary movement. This movement converting device 27 also comprises at least one wheel 28 which slides on the surface of the die 3 during the delivery of the filling shoe 9 and is thereby rotated. Said rotational movement is then transmitted by means of a corresponding connecting element 29, for example at least one spindle, to the shaft 22 of the scraping element.

Preferably, a plurality of wheels 28 is provided, in particular two or four, so that the filling shoe 9 forms a running car. Said wheels are arranged respectively to the side of the filling cavity 13.

In the particularly preferred embodiment of this embodiment variant of the filling shoe 9 at least one longitudinal groove 30 is formed in the die 3 and/or in the die mount 6 (FIG. 1), in particular two longitudinal grooves 30 running parallel to one another, in which the wheel 28 or the wheels 28 is/are directed during the delivery movement of the filling shoe 9, so that the latter is also guided during the delivery movement.

It is also possible for the movement converting device 27 to comprise a transmission gear, whereby the speed of the scraping element 21 (or the hub 24) at constant speed of the translatory movement can be increased or reduced, in case the length of the delivery path of the filling shoe 9 is too short or too long.

In all of the embodiment variants of the filling shoe 9 it is an advantage if the at least one filling opening 18 is arranged above the scraping element 21 and offset relative to the latter in relation to the axis of rotation, as shown in particular in FIG. 3.

It is also possible for the drive device 23 to have a direction of rotation changing device for changing the direction of rotation of the scraping element 21, whereby this takes place automatically in the embodiment variant of the filling shoe according to FIG. 6 with the change of linear movement.

Since in the preferred embodiment variant of the filling shoe 9 the latter scraps along the inner surface 19 of the filling cavity 13, it is an advantage if the at least one scraping element 21 is provided at least partly with a friction-reducing coating or is made from a material which has a lower coefficient of friction than the material of the casing. For example, the coating or the material can be made of PTFE. In the case of the coating it is also possible to use a lubricant paint known from the prior art, which if necessary contains solid lubricants. Solid lubricants of this kind, such as for example $MoS_2$ and/or graphite, can however also be included in the material of the scraping element 21.

According to a further embodiment variant of the filling shoe 9 the shaft 22 can be designed in one piece with the scraping element 21 or scraping elements 21.

Although in the above description it has been assumed that the filling shoe 9 is assigned to the press 1, it is of course possible to arrange the latter in a separate filling station independently of the press 1 in the production line of sintered molded parts.

The filling shoe 9 enables an automatically modulated filling of the mold cavity 10 of the press 1 for the production of sintered molded parts. For this the filling shoe 9 in a first step is moved out of the position of rest into the filling position above the mold cavity 10. Afterwards the powder is filled through the filling cavity 13 of the filling shoe 9 into the mold cavity 10. Then the scraping element 21 is set to rotate, thereby improving the homogeneity of the mold cavity filling, in particular with regard to the density distribution at the front and back as well as right and left of the axis of rotation of the scraping element 21. As the filling shoe 9 is preferably used for the production of round, in particular symmetrical, sintered molded parts, such as e.g. gear wheels, sliding sleeves of gears, synchronizer bodies of gears, synchronizer hubs, synchronizer rings, etc., in this way there is also an improvement with respect to the run out errors of the finished sintered molded part even without any mechanical post-processing.

The rotation of the scraping element 21 can be performed in one direction. Likewise, scraping on both sides is possible by reversing the direction of rotation.

It is also possible for the scraping element 21 to scrape over the area to be scraped in one or more complete rotations of 360°. It is also possible with the configuration of the hub 24, that only a subsection, i.e. a sector, of 360° is scraped over by a scraping element 21, the size of the subsection being preferably at least almost equal, in particular is equal. In this case only one sector rotation is performed.

After the scraping movement the filling shoe 9 is returned to the position of rest and the powder in the press is pressed into a so-called green compact, in particular biaxially, then sintered and processed further, as known from the prior art.

Although the filling shoe 9 is preferably used for producing sintered molded parts made from metal powders or metal powder mixtures, the filling shoe 9 can also be used for the production of other green compacts or pellets, for example ceramics.

The exemplary embodiments show possible embodiment variants of the filling shoe 9, whereby it should be noted at this point that various different combinations of the individual embodiment variants are also possible and this variability, due to the teaching on technical procedure, lies within the ability of a person skilled in the art in this technical field.

Finally, as a point of formality, it should be noted that for a better understanding of the structure of the filling shoe 9, the latter and its components have not been represented true to scale in part and/or have been enlarged and/or reduced in size.

LIST OF REFERENCE NUMERALS

| | |
|---|---|
| 1 | press |
| 2 | pressing device |
| 3 | die |
| 4 | lower punch mount |
| 5 | upper punch mount |
| 6 | die mount |
| 7 | column |
| 8 | column |
| 9 | filling shoe |
| 10 | mold cavity |
| 11 | storage container |
| 12 | pipe |
| 13 | filling cavity |
| 14 | casing |
| 15 | contact surface |
| 16 | cross section |
| 17 | cross section |
| 18 | filling cavity |
| 19 | surface |
| 20 | connecting element |
| 21 | scraping element |
| 22 | shaft |
| 23 | drive device |
| 24 | hub |
| 25 | end |
| 26 | bend |
| 27 | movement converting device |
| 28 | wheel |
| 29 | connecting element |
| 30 | longitudinal groove |

The invention claimed is:

1. A filling shoe for filling a mold cavity of a press mold with a powder, the filling shoe comprising a casing with at least one filling cavity comprising at least one side wall, wherein at least one filling opening is formed in the casing, wherein the powder can be inserted through the at least one filling opening, into the filling cavity, and directly into the mold cavity of the press mold, wherein said at least one filling opening is connected to at least one storage container via at least one pipe, wherein in the filling cavity at least one scraping element is arranged, the at least one scraping element being connected to a drive device, wherein the at least one scraping element is rotatably mounted on a shaft, the shaft forming an axis of rotation for the at least one scraping element, wherein the shaft is arranged centrically in the at least one filling cavity and vertically in the casing, and wherein the at least one filling opening is arranged above the at least one scraping element and laterally offset from the axis of rotation of the at least one scraping element.

2. The filling shoe as claimed in claim 1, wherein the at least one scraping element is in the form of a strip.

3. The filling shoe as claimed in claim 2, wherein the at least one scraping element at a free end facing the casing has a bend, which is arranged immediately adjacent to the side wall of the filling cavity.

4. The filling shoe as claimed in claim 1, wherein a plurality of scraping elements form a common hub.

5. The filling shoe as claimed in claim 1, wherein the drive device is a motor.

6. The filling shoe as claimed in claim 1, wherein the drive device is at least a movement converting device which is arranged in or on the side wall of the filling cavity, and converts a translatory movement of the filling shoe into a rotary movement of the scraping element.

7. The filling shoe as claimed in claim 1, wherein the at least one scraping element is configured to be straight or curved in a concave form.

8. The filling shoe as claimed in claim 1, wherein the drive device is designed with a direction of rotation changing device for changing the direction of rotation of the scraping element.

9. The filling shoe as claimed in claim 1, wherein the at least one scraping element is provided at least in part with a friction-reducing coating or is made from a material which has a lower coefficient of friction than the material of the casing.

* * * * *